Oct. 10, 1950     G. L. MERRILL     2,525,420
CAM CHECKING FIXTURE

Filed March 19, 1945     2 Sheets-Sheet 1

INVENTOR.
GEORGE L. MERRILL
BY
Kwis Hudson Boughton & Williams
ATTORNEYS

Oct. 10, 1950   G. L. MERRILL   2,525,420
CAM CHECKING FIXTURE
Filed March 19, 1945   2 Sheets-Sheet 2

INVENTOR.
GEORGE L. MERRILL
BY
Kwis Hudson, Boughton & Williams
ATTORNEYS

Patented Oct. 10, 1950

2,525,420

UNITED STATES PATENT OFFICE 2,525,420

CAM CHECKING FIXTURE

George L. Merrill, East Cleveland, Ohio, assignor to The Cleveland Hobbing Machine Company, Euclid, Ohio, a corporation of Ohio Application March 19, 1945, Serial No. 583,437

1 Claim. (Cl. 33—174)

The present invention relates to cam checking devices and, more particularly, to a device for checking plate and radial type cams.

One of the principal objects of the invention is the provision of a novel and improved, simple, inexpensive, and accurate device for checking plate cams used with radial type cutters and which device will withstand considerable rough usage.

Another object of the invention is the provision of a novel and improved device for checking plate and radial cams, which device comprises two members reciprocable along linear paths extending at right angles with respect to each other, one of which members is adapted to have the cam to be checked affixed thereto and the other of which members is adapted to engage the cam surface, in combination with precision means for determining the position of the members with respect to points of reference.

The invention resides in certain constructions and combinations and arrangements of parts and further objects and advantages will be apparent to those skilled in the art to which it relates from the following description of the preferred embodiment described with reference to the accompanying drawings forming a part of this specification, and in which.

Figure 1:
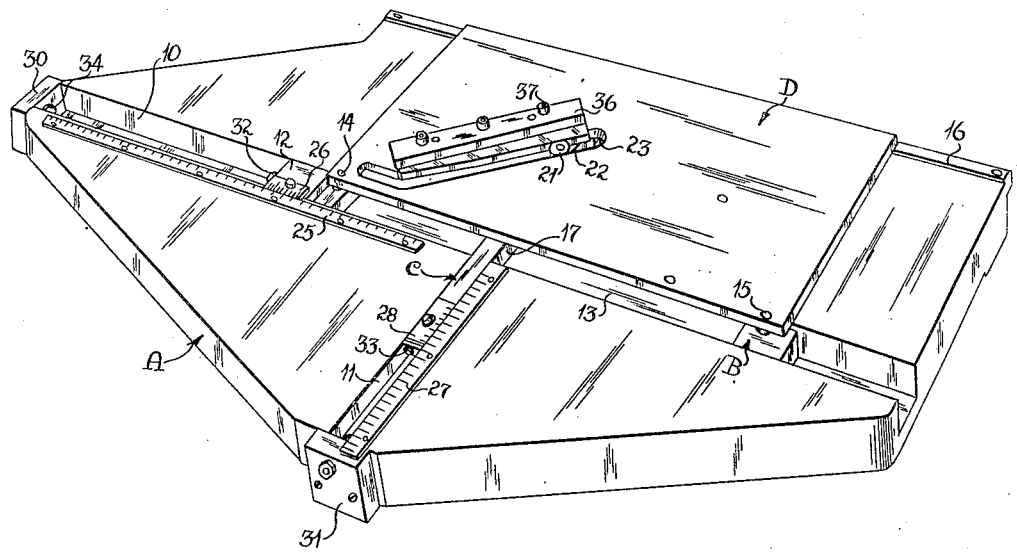
Fig. 1 is a perspective view of a cam checking device embodying the present invention, with a cam to be checked positioned thereon.
Figure 2:
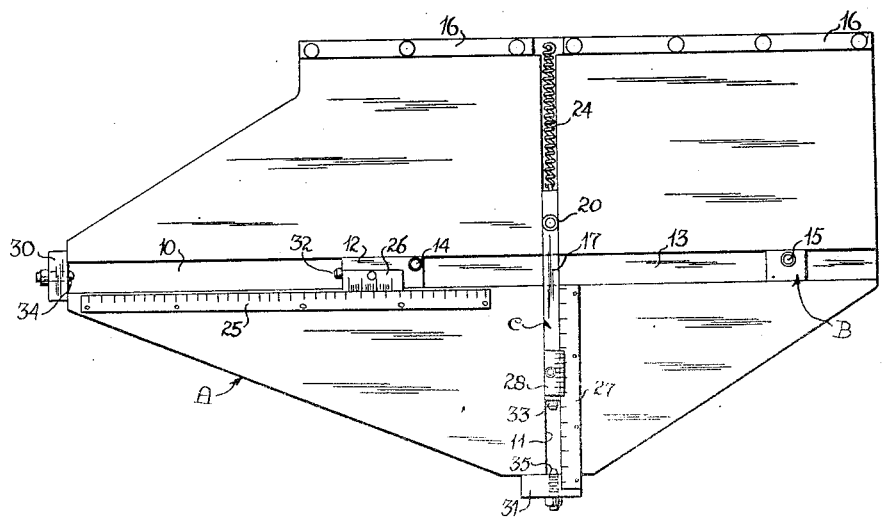
Fig. 2 is a plan view of the device shown in Fig. 1, with the cam removed.

Although the invention is susceptible of various modifications and alternative constructions, it is herein shown and described as embodied in a device particularly suitable for checking plate cams similar to the cams employed in the machines shown in U. S. Patents to Staples, Nos. 2,341,668, 2,346,515 and 2,362,318, however, it is to be understood that the invention is applicable to the checking of other cams.

Referring to the drawings, the device shown comprises a plate-like member A having two straight grooves 10 and 11 in the upper surface thereof, which grooves are located at right angles with respect to each other and intersect each other at approximately the center of the plate. The longitudinally extending groove 10 is deeper than the transversely extending groove 11 and has a cam supporting assembly B slidably supported therein while the transverse groove 11 has a cam follower assembly C slidably supported therein. The assembly B comprises a bar 12, the upper surface of which is cut away as at 13 to accommodate the assembly C, and is provided adjacent to its ends with upwardly projecting pins 14, 15, the upper ends of which are reduced and adapted to engage within locating apertures in the cam assembly D. When the cam assembly D is positioned over the upper ends of the pins 14, 15, the plate rests upon the shoulders formed by the reduced portions. As shown, the rear edge of the cam plate rests upon hardened bars or members 16 affixed to the upper rear edge of the member A.

The transversely reciprocable assembly C comprises a bar 17 provided with a cam follower in the form of a roller 20 supported upon the upper end of a vertical pin 21 secured in the bar 17 adjacent to its rear end. In the particular cam assembly shown, the cam surface is the rear wall 22 of the inclined portion of the slot 23 in the cam plate and, preferably, some means, such as, a spring 24 or a weight is attached to the rear end of the assembly C so as to maintain the cam roller 20 in engagement with the surface 22 during operation of the device. Alternatively the cam roller can be manually maintained in engagement with the surface 22 by the operator.

Precision means is provided for determining the relative position of each of the assemblies B and C relative to a reference point. In the embodiment shown, the precision means comprises cooperating indicia including vernier means or, alternatively, space gauges. Referring to the first method mentioned, a scale 25 is provided along the front side of the left-hand end of the slot 10, and the left-hand end of the member 12 is provided with a vernier 26 adjustably secured thereto, which vernier cooperates with the scale 25 to give a reading in thousandths of an inch. A similar scale 27 along the right-hand side of the front portion of the slot 11 and a cooperating vernier 28 adjustably secured to the forward end of the member 17 give a similar reading for the cam follower assembly C. Preferably the scales, etc., are so located that the position of the center of the roller 20 with respect to some reference point on the cam assembly D can be read directly thereon. In the embodiment shown, this reference point is the center of the locating pin 14 and when the cam is laid out, all of the parts thereof are dimensioned with respect to this center.

If it is desired, space gauges can be employed to determine the position of the roller 20 with respect to the reference point on the cam assembly by placing the gauges in the slots 10 and 11 intermediate the ends of the assemblies B and C and members 30, 31, respectively. Preferably the ends of the members 12 and 17 adjacent to the members 30, 31 are provided with fixed abutments 32, 33 adapted to respectively engage the space gauges placed in corresponding slots. The members 30, 31, which are detachably connected to the plate A by threaded fasteners, include adjustable abutments 34, 35 adapted to also respectively engage the space gauges placed in the corresponding slots. The space gauges employed are such that, when they are in engagement with the adjacent abutments 32, 34 or 33, 35, the distance between the abutments is indicated. Since such gauges, which may be accurately formed gauge blocks or adjustable devices known as "inside micrometers" are conventional and do not per se form a part of the invention, they are not illustrated. As shown, the cam surface 22 to be checked is formed on a hardened insert 36 detachably secured to the cam plate by screws 37, however, it is to be understood that the cam surface may be formed directly upon the cam plate.

Figure 3:
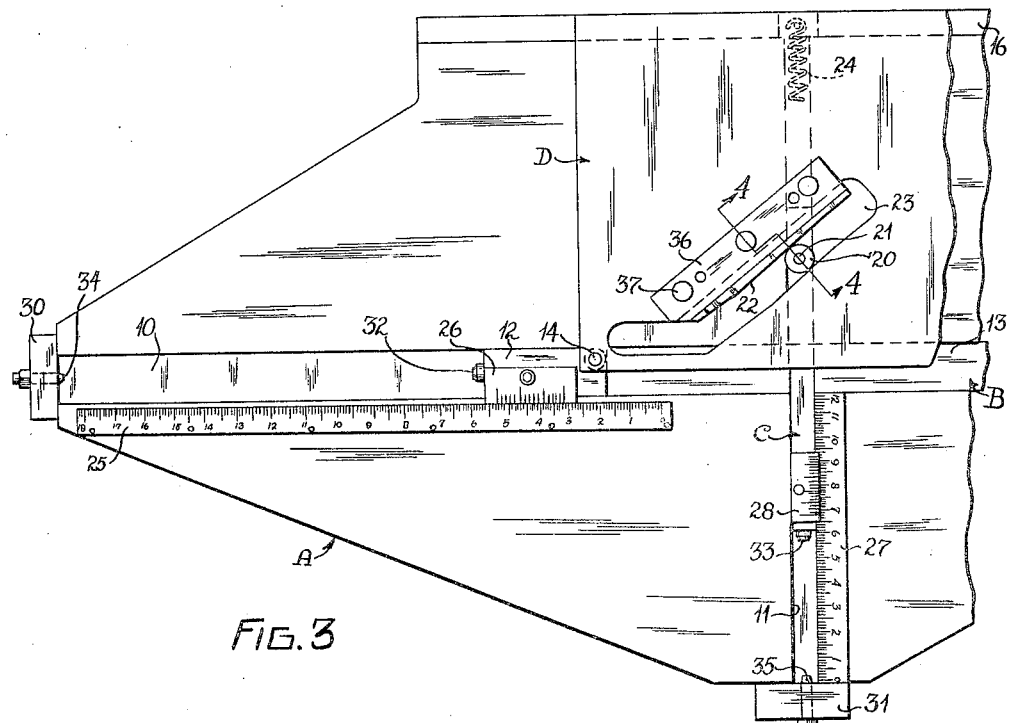
Fig. 3 is a fragmentary plan view of a portion of Fig. 1.
Figure 5:
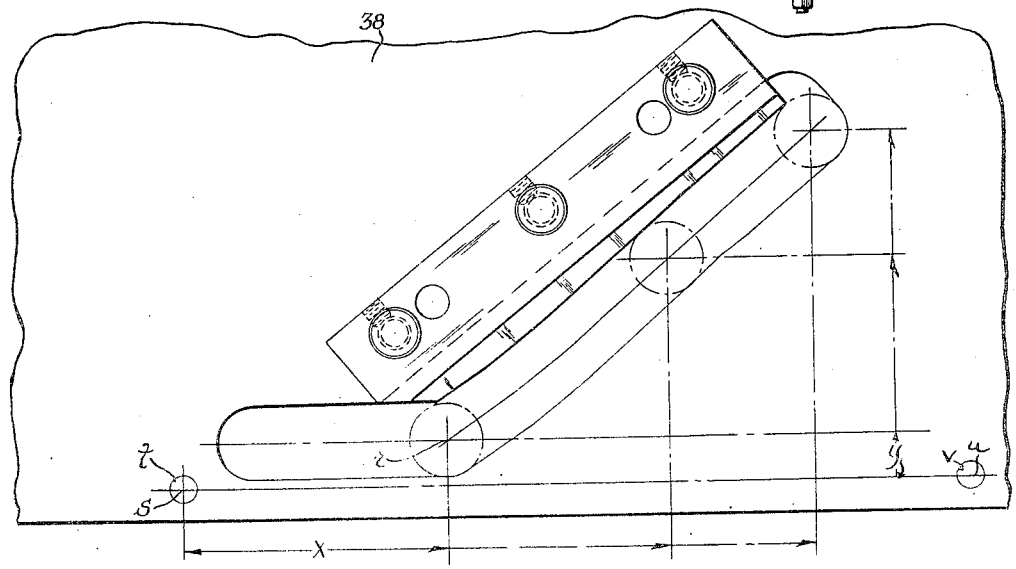
Fig. 5 is a fragmentary view of the layout drawing against which the cam is to be checked.
Figure 4:
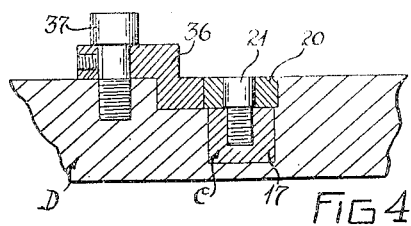
Fig. 4 is a fragmentary sectional view approximately on the line 4—4 of Fig. 3.

Referring to Fig. 5 which shows a part of the layout drawing 38 for the cam shown in Fig. 3, the distance between the center $r$ of the cam follower roller and the center $s$ of the locating aperture $t$ in the direction parallel with a line connecting the centers $s$ and $u$ of the locating apertures $t$ and $v$ is designated generally by the reference character $x$, and the distance between the center $r$ and the center $s$ in a direction at right angles to a line connecting the centers of the locating apertures is designated generally by the reference character $y$. With the foregoing in mind, it will be apparent that the cam surface 22 can be readily checked by setting the assembly B to any dimension $x$ on the drawing and checking the reading obtained on the scale and vernier 27, 28 against the dimension $y$ on the drawing for the same setting. Alternatively the cam follower assembly C may be set to any dimension on the drawing and the reading obtained on the scale and vernier 25, 26 checked against the drawing.

From the foregoing description of the preferred embodiment of the invention, it will be apparent that the objects heretofore enumerated have been accomplished and that a simple and inexpensive device has been provided for checking plate cams and the like. While the invention has been described in considerable detail, it is not limited to the particular construction shown and it is my intention to hereby cover all adaptations, modifications and uses thereof which come within the practice of those skilled in the art to which the invention relates and within the spirit and scope of the appended claim.

Having thus described my invention, what I claim is:

In a cam checking device of the character referred to, the combination of a plate-like member having a pair of straight slots in the upper surface thereof located at right angles with respect to each other, a member slidably supported in one of said slots and adapted to support a rectangularly-shaped cam plate having a slot therein at least a portion of one side of which constitutes a cam surface the accuracy of which it is desired to check, means comprising a plurality of pins fixedly connected to said member for holding said cam plate in predetermined position with respect to said member, precision means for determining the position of said member in its slot with respect to a reference point on said plate, a second member slidably supported in the second of said slots, a roller carried by said second member and adapted to engage the cam surface which it is desired to check, and precision means for determining the position of said second member with respect to a reference point on said plate.

GEORGE L. MERRILL.

REFERENCES CITED

The following references are of record in the file of this patent:

UNITED STATES PATENTS

| Number | Name | Date |
|---|---|---|
| 469,680 | Clark | Mar. 1, 1892 |
| 906,581 | Toreson | Dec. 15, 1908 |
| 1,564,589 | Laessker | Dec. 8, 1925 |
| 1,615,668 | Anderson | Jan. 25, 1937 |
| 2,166,692 | Ray | July 18, 1939 |
| 2,209,498 | Wittman | July 30, 1940 |
| 2,296,894 | Bauer | Sept. 29, 1942 |
| 2,341,107 | MacDonald | Feb. 8, 1944 |
| 2,369,477 | Martin | Feb. 13, 1945 |
| 2,387,852 | Maloff | Oct. 30, 1945 |